US008829814B2

United States Patent
He et al.

(10) Patent No.: US 8,829,814 B2
(45) Date of Patent: Sep. 9, 2014

(54) BACKLIGHT MODULE DETECTING ABNORMAL LAMP TUBES AND AN LCD THEREOF

(75) Inventors: Chengming He, Shenzhen (CN); Chingyuan Yang, Shenzhen (CH)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 831 days.

(21) Appl. No.: 13/000,542

(22) PCT Filed: Aug. 23, 2010

(86) PCT No.: PCT/CN2010/076253
§ 371 (c)(1),
(2), (4) Date: Mar. 31, 2011

(87) PCT Pub. No.: WO2012/000217
PCT Pub. Date: Jan. 5, 2012

(65) Prior Publication Data
US 2012/0001571 A1    Jan. 5, 2012

(30) Foreign Application Priority Data

Jul. 2, 2010   (CN) .......................... 2010 1 0219389

(51) Int. Cl.
*H05B 41/36*     (2006.01)
*H05B 41/285*    (2006.01)

(52) U.S. Cl.
CPC ........... *H05B 41/2855* (2013.01); *Y02B 20/186* (2013.01)
USPC ............................ 315/307; 315/254; 315/312

(58) Field of Classification Search
USPC ................. 315/254, 255, 294, 307–309, 312
See application file for complete search history.

(56) References Cited

U.S. PATENT DOCUMENTS

2005/0269973 A1*  12/2005  Jang et al. ...................... 315/307
2006/0226793 A1*  10/2006  Matsuura ....................... 315/307
2009/0309508 A1*  12/2009  Hung ............................. 315/255

FOREIGN PATENT DOCUMENTS

| CN | 1737648 A | 2/2006 |
|---|---|---|
| CN | 1983367 A | 6/2007 |
| CN | 101055703 A | 10/2007 |
| CN | 101311793 A | 11/2008 |
| CN | 201188712 Y | 1/2009 |
| CN | 101360379 A | 2/2009 |
| CN | 201290195 Y | 8/2009 |
| KR | 20080062534 A | 7/2008 |

* cited by examiner

*Primary Examiner* — Don Le
(74) *Attorney, Agent, or Firm* — Sughrue Mion, PLLC

(57) ABSTRACT

A backlight module detecting abnormal lamp tubes and an LCD employing such a backlight module are proposed. The LCD includes a voltage calculator for detecting voltage applied on ends of a lamp tube to monitor the lamp tube. Once the lamp tube becomes abnormal, the voltage varies accordingly. The voltage calculator calculates a voltage signal from a plurality of lamp tubes and produces a voltage value. A protection circuit regards the voltage value as a feedback signal to decide if there are any abnormalities. Once any of the lamp tubes is abnormal, the protection circuit transmits the voltage signal to a pulse-width modulated integrated circuit (PWM IC) to activate a protective function. The protection circuit of the present invention obtains the protection signal by sampling the voltage signal of the ends of the lamp tube and then gets the control signal by means of the calculation of the voltage calculator. Thus, voltage level retrieved from the protection signal are less easily affected by dimming and temperature.

11 Claims, 3 Drawing Sheets

BACKLIGHT MODULE DETECTING ABNORMAL LAMP TUBES AND AN LCD THEREOF

BACKGROUND OF THE INVENTION

1. Field of the Invention

The present invention relates to a backlight module and a liquid crystal display (LCD) employing such a backlight module, and more particularly, to a backlight module which can detect abnormal lamp tubes and an LCD having such a backlight module.

2. Description of Prior Art

With a rapid development of monitor types, novel and colorful monitors with high resolution, e.g., liquid crystal displays (LCDs), are indispensable components used in various electronic products such as monitors for notebook computers, personal digital assistants (PDAs), digital cameras, and projectors. The demand for the novelty and colorful monitors has increased tremendously.

Most of the TFT-LCDs utilize Cold Cathode Fluorescent Lamps (CCFL) as backlight sources. The CCFL can emit light when noble gas inside the lamp is driven by a high-frequency driving voltage. In addition, the required driving voltage increases as CCFL length increases. Yet, the current leakage also increases as CCFL length increases and an increase in the operating voltage. Therefore, the length of the CCFL and the operating voltage applied to the CCFL are associated with an increasing amount of current leakage.

Conventionally, a commonly-used method of enabling the CCFL is to apply a high frequency driving voltage on one end of the CCFL and the other end is coupled to ground or to be floated. Thus, the lamp tube has a high voltage on one end and a low voltage on the other end. The higher the operating voltage is, the non-linearly greater the current leakage is. Furthermore, a decrease in current is varied as an increase in distance far from the high voltage end of the CCFL, thereby incurring uneven display quality and uneven brightness contrast.

For that reason, traditional inverters usually employ a transformer with a primary winding in series to balance the current output to the lamp tube. But it requires a larger printed circuit board (PCB) and higher design costs to use a transformer to balance the current. So, another design method, that is, ballast capacitors coupled to the lamp tube, is employed in the inverter. This design method is characterized by simplicity and cheapness, so design costs can be reduced. This method mostly uses a single transformer to activate all of the lamp tubes and then utilizes ballast capacitors to be a balancing device of the current of the lamp tube. However, the greatest risk to this method is that, a protection circuit cannot perform its function when the lamp tube is malfunction or the ballast capacitor cracks/is poorly soldered; it contains some potential dangers.

SUMMARY OF THE INVENTION

An object of the present invention is to provide a liquid crystal display (LCD) which can detect abnormal lamp tubes for performing real-time protection if there is something wrong with lamp tubes or ballast capacitors.

In one aspect of the present invention, a liquid crystal display comprises a liquid crystal display panel, a lamp tube comprising a first end and a second end, an inverter comprising an input end electrically connected to an external power supply for inverting the external power supply into a supply voltage based on a control signal, a first transformer electrically connected to the first end of the lamp tube, for converting the supply voltage into a first driving voltage signal, and outputting the first driving voltage signal to the first end of the lamp tube, a second transformer electrically connected to the second end of the lamp tube for converting the supply voltage into a second driving voltage signal, and outputting the second driving voltage signal to the second end of the lamp tube, a first detecting circuit electrically connected to the first end of the lamp tube, for detecting voltage applied on the first end of the lamp tube, a second detecting circuit electrically connected to the second end of the lamp tube, for detecting voltage applied on the second end of the lamp tube, a comparator electrically connected to the first detecting circuit and the second detecting circuit, for generating a protection signal based on a difference between the voltages applied on the first and second ends of the lamp tube, wherein the inverter adjusts the supply voltage in response to an amplitude of the protection signal in excess of a predetermined value corresponding to an open-circuit of the lamp tube.

In another aspect of the present invention, a backlight module comprises a lamp tube comprising a first end and a second end, an inverter comprising an input end electrically connected to an external power supply for inverting the external power supply into a supply voltage based on a control signal, a first transformer electrically connected to the first end of the lamp tube, for converting the supply voltage into a first driving voltage signal, and outputting the first driving voltage signal to the first end of the lamp tube, a second transformer electrically connected to the second end of the lamp tube for converting the supply voltage into a second driving voltage signal, and outputting the second driving voltage signal to the second end of the lamp tube, a first detecting circuit electrically connected to the first end of the lamp tube, for detecting voltage applied on the first end of the lamp tube, a second detecting circuit electrically connected to the second end of the lamp tube, for detecting voltage applied on the second end of the lamp tube, a comparator electrically connected to the first detecting circuit and the second detecting circuit, for generating a protection signal based on a difference between the voltages applied on the first and second ends of the lamp tube, wherein the inverter adjusts the supply voltage in response to an amplitude of the protection signal in excess of a predetermined value corresponding to an open-circuit of the lamp tube.

According to the present invention, the lamp tube is a Cold Cathode Fluorescent Lamp (CCFL).

According to the present invention, a phase difference between the first driving voltage signal and the second driving voltage signal is 180 degrees.

According to the present invention, a voltage calculator electrically connected to the comparator and the inverter is used for generating a control signal having a duty cycle depending on the amplitude of the protection signal.

The present invention monitors lamp tubes by detecting voltages applied on their ends. Once lamps tubes or ballast capacitors are in an abnormal state, there will be a wide range of variations in voltages applied on the ends of the lamp tubes. Any abnormalities can be detected by a comparator detecting a difference between voltages applied on the ends of lamp tubes and a voltage calculator calculating voltage values of control signals. Once an abnormality occurs, a protection circuit will transmit a voltage signal to the voltage calculator to start to perform a protection operation.

These and other objects of the claimed invention will no doubt become obvious to those of ordinary skill in the art after

DETAILED DESCRIPTION OF THE PREFERRED EMBODIMENTS

Figure 1:
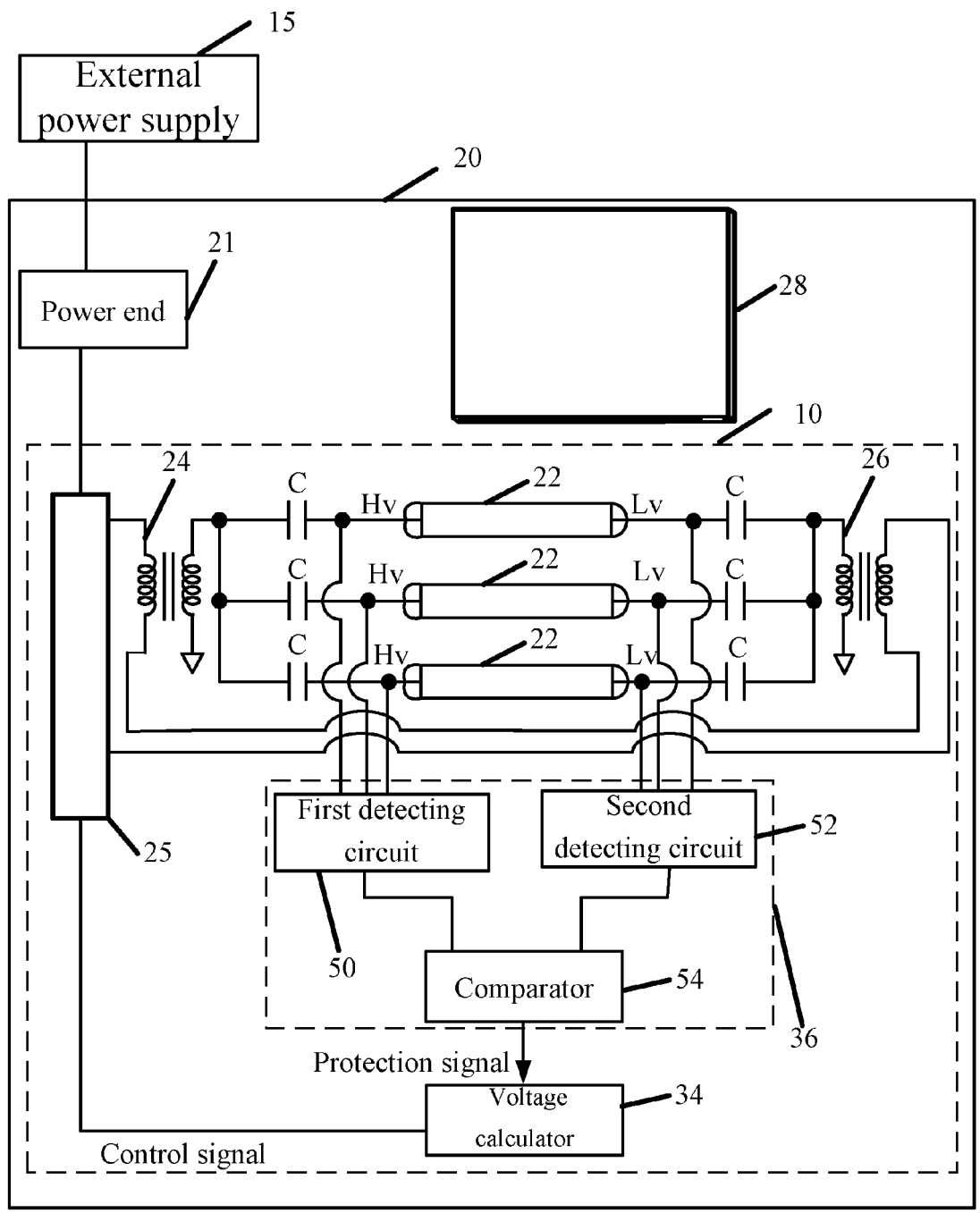
FIG. 1 is a schematic diagram of a liquid crystal display (LCD) according to an embodiment of the present invention.
Figure 2:
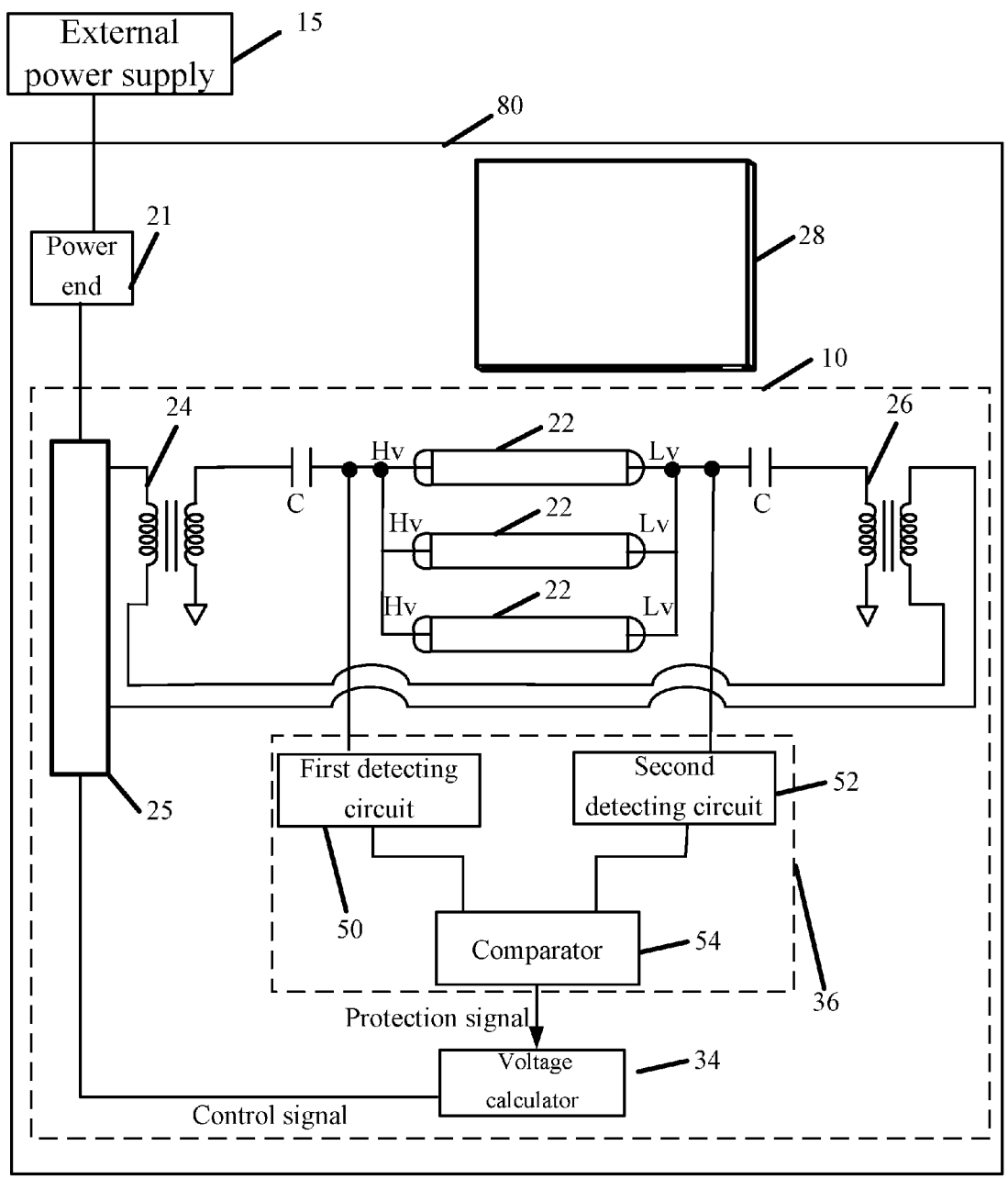
FIG. 2 is a schematic diagram of an LCD according to another embodiment of the present invention.

Referring to FIG. 1 and FIG. 2, FIG. 1 is a schematic diagram of a liquid crystal display (LCD) 20 according to an embodiment of the present invention, and FIG. 2 is a schematic diagram of an LCD 80 according to another embodiment of the present invention. Both of the LCD 20 and the LCD 80 comprise a backlight module 10 and an LCD panel 28. The backlight module 10 comprises a power end 21, a plurality of lamp tubes 22, an inverter 25, a first transformer 24, a second transformer 26, a plurality of ballast capacitors C, a voltage calculator 34, and a protection circuit 36. The power end 21, providing a supply voltage that the LCD 20 requires, acts as a connecting interface of an external power supply 15 (e.g., a commercial alternating current, a battery, or other public power sources) and transmits an alternating current from the external power supply 15 to the inverter 25. The plurality of lamp tubes 22, disposed below the LCD panel 28 for producing light that the LCD 20 requires, are Cold Cathode Fluorescent Lamps (CCFLs). Each of the lamp tubes 22 comprises a high-voltage end Hv and a low-voltage end Lv. Both of the ends are connected to a ballast capacitor C for preventing voltage flowing through the high-voltage end Hv or the low-voltage end Lv from being unstable and burning out the lamp tubes 22. The difference between the LCD 20 and the LCD 80 only lies on the link relations among the ballast capacitors C, the first transformer 24, the second transformer 26, and the lamp tubes 22. In FIG. 1, both ends of the ballast capacitor C are connected to the lamp tube 22 and to an output end of the first transformer 24 or the second transformer 26. In FIG. 2, one ballast capacitor C is connected between the high-voltage end Hv of the plurality of the lamp tubes 22 and an output end of the first transformer 24 with one end, and the other ballast capacitor C is connected between a low-voltage end Lv of the plurality of the lamp tubes 22 and an output end of the second transformer 26 with one end. The inverter 25, comprising a commonly used circuit like a bridge converter, is electrically connected to the voltage calculator 34, the first transformer 24, and the second transformer 26 for adjusting a voltage input from the power end 21 to produce a supply voltage based on a control signal transmitted from the voltage calculator 34. The supply voltage is converted into a first driving voltage signal and a second driving voltage signal through the first transformer 24 and the second transformer 26, respectively. Then, the first and second driving voltage signals are individually transmitted to the high-voltage end Hv and the low-voltage end Lv of the lamp tube 22. The lamp tube 22 produces light based on the voltage difference of the first driving voltage signal of the high-voltage end Hv and the second driving voltage signal of the low-voltage end Lv. Because the phase difference between the first driving voltage signal and the second driving voltage signal is 180 degrees and the amplitude of the two driving voltage signals is the same, the voltage difference of the high-voltage end Hv and the low-voltage end Lv of the lamp tube 22 is twice the amplitude of the first driving voltage signal. The LCD panel 28 comprises a liquid crystal (LC) layer made of LC cells. The LC cells generate a variety of array angles based upon each image data for adjusting light emitted from the plurality of lamp tubes 22 to display different gray-scale images.

Please continue to refer to FIG. 1 and FIG. 2. In the beginning, the inverter 25 produces a supply voltage based on an alternating current transmitted from the power end 21 and provides the supply voltage to the first transformer 24 and the second transformer 26, which generate the first driving voltage signal and the second driving voltage signal based on the supply voltage. The two driving voltage signals have opposite phase. Afterwards, the first transformer 24 transforms the supply voltage to the first driving voltage signal and outputs the first driving voltage signal to the high-voltage Hv of the plurality of lamp tubes 22; the second transformer 26 transforms the supply voltage to the second driving voltage signal and outputs the second driving voltage signal to the low-voltage Lv of the plurality of lamp tubes 22. Generally, the first driving voltage signal of the first transformer 24 and the second driving voltage signal of the second transformer 26 have opposite phase; that is, there is a 180-degree phase difference between the two signals. In addition, the two driving voltage signals are of identical amplitude. For instance, if the lamp tubes 22 require a driving voltage with an amplitude of 1200 volts, an amplitude of the first driving voltage signal output by the first transformer 24 as well as that of the second driving voltage signal output by the second transformer 26 is 600 volts. Because the phase difference between the two signals is 180 degrees, the total amplitude of the plurality of lamp tubes 22 is 1200 volts.

To detect if the lamp tubes 22 are malfunction or if the ballast capacitors C crack/are poorly soldered, the protection circuit 36, electrically connected to the high-voltage end Hv and the low-voltage end Lv of each of the lamp tubes 22, detects variations in voltage and generates a protection signal based on the variations. The protection circuit 36 comprises a first detecting circuit 50, a second detecting circuit 52, and a comparator 54. The first detecting circuit 50 is electrically connected to the high-voltage end Hv of each of the lamp tubes 22 and the ballast capacitor C for detecting voltage applied on the high-voltage end Hv of the lamp tube 22. The second detecting circuit 52 is electrically connected to the low-voltage end Lv of each of the lamp tubes 22 and the ballast capacitor C for detecting voltage applied on the low-voltage end Lv of the lamp tube 22.

Figure 3:
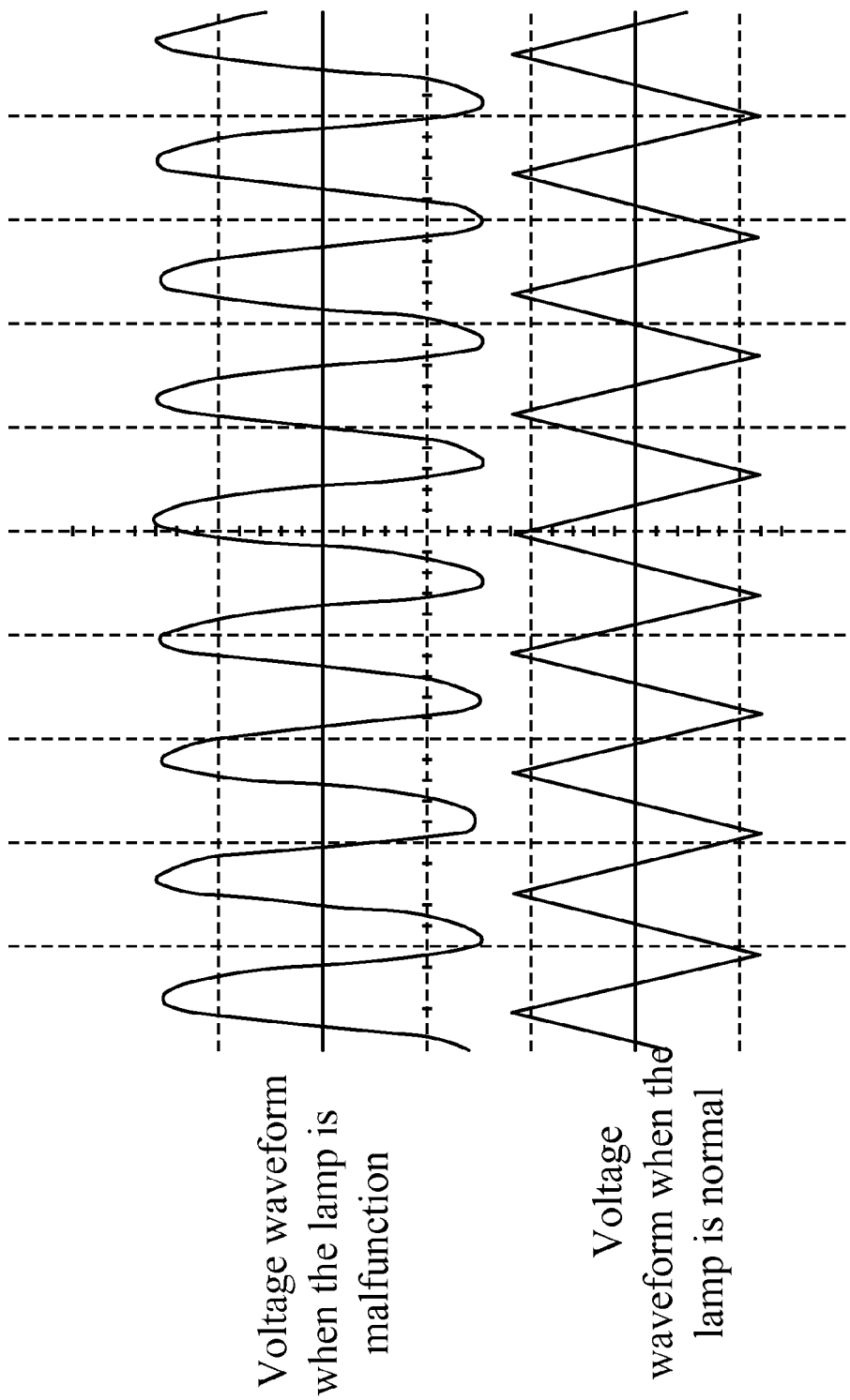
FIG. 3 illustrates a comparison of voltage changes between the lamp tubes activated in normal and abnormal states.

Please refer to FIG. 1, FIG. 2, and FIG. 3. FIG. 3 is a voltage change diagram of the lamp tubes 22 of the present invention activated in normal and abnormal states. The lamp tube 22 or the ballast capacitor C will have drastic variations in voltage once any of the tubes 22 is malfunction or once any of the ballast capacitor C cracks/is poorly soldered. The comparator 54 generates a protection signal by comparing voltage detected by the first detecting circuit 50 with that detected by the second detecting circuit 52. As shown in FIG. 3, the amplitude of the first driving voltage signal and the second driving voltage signal in a normal state differs from that in an abnormal state. The protection signal output by the protection circuit 36 is transmitted to the voltage calculator 34, which is a pulse-width modulated integrated circuit (PWM IC), for modulating the protection signal to generate control signals with different duty cycles and to output the control signals to the inverter 25 based on the amplitude of the protection signal. For instance, the amplitude of the protection signal passing through the output of the first detecting circuit 50 increases and exceeds a predetermined value corresponding to an abnormality of one of the lamp tubes 22. The voltage calculator 34 generates a control signal with a larger duty cycle based on the amplitude of the protection signal. Contrarily, the amplitude of the protection signal passing through the outputs of the first detecting circuit 50 and the second detecting circuit 52 does not exceed the predetermined value when all of the lamp tubes 22 are in a normal state. The voltage calculator 34 generates a control signal with a smaller duty cycle based on the amplitude of the protection signal. Thus, the inverter 25 can instantly adjust the supply voltage to decide the illumination state of the lamp tubes 22 or activate a corresponding protective function based on a duty cycle of the control signal. The protection circuit 36 directly detects voltages applied on the two ends of the lamp tube 22 and receives a feedback control signal through the voltage calculator 34. Hence, voltage quasi cells retrieved from the protection signal are less easily affected by dimming and temperature.

Although the present invention has been explained by the embodiments shown in the drawings described above, it should be understood to the ordinary skilled person in the art that the invention is not limited to the embodiments, but rather various changes or modifications thereof are possible without departing from the spirit of the invention. Accordingly, the scope of the invention shall be determined only by the appended claims and their equivalents.

What is claimed is:

1. A liquid crystal display comprising a liquid crystal display panel, a lamp tube comprising a first end and a second end, an inverter comprising an input end electrically connected to an external power supply for inverting the external power supply into a supply voltage based on a control signal, a first transformer electrically connected to the first end of the lamp tube for converting the supply voltage into a first driving voltage signal, and outputting the first driving voltage signal to the first end of the lamp tube, a second transformer electrically connected to the second end of the lamp tube for converting the supply voltage into a second driving voltage signal, and outputting the second driving voltage signal to the second end of the lamp tube, characterized in that the liquid crystal display further comprising:
   a plurality of ballast capacitors electrically connected to the first end and the second end of the lamp tube;
   a first detecting circuit electrically connected to the first end of the lamp tube, for detecting voltage applied on the first end of the lamp tube;
   a second detecting circuit electrically connected to the second end of the lamp tube, for detecting voltage applied on the second end of the lamp tube; and
   a comparator electrically connected to the first detecting circuit and the second detecting circuit, for generating a protection signal based on a difference between the voltages applied on the first and second ends of the lamp tube, wherein the inverter adjusts the supply voltage in response to an amplitude of the protection signal in excess of a predetermined value corresponding to an open-circuit of the lamp tube; and
   a voltage calculator electrically connected to the comparator and the inverter, for generating a control signal having a duty cycle depending on the amplitude of the protection signal,
   wherein a phase difference between the first driving voltage signal and the second driving voltage signal is 180 degrees.

2. A liquid crystal display comprising a liquid crystal display panel, a lamp tube comprising a first end and a second end, an inverter comprising an input end electrically connected to an external power supply for inverting the external power supply into a supply voltage based on a control signal, a first transformer electrically connected to the first end of the lamp tube for converting the supply voltage into a first driving voltage signal, and outputting the first driving voltage signal to the first end of the lamp tube, a second transformer electrically connected to the second end of the lamp tube for converting the supply voltage into a second driving voltage signal, and outputting the second driving voltage signal to the second end of the lamp tube, characterized in that the liquid crystal display further comprising:
   a first detecting circuit electrically connected to the first end of the lamp tube, for detecting voltage applied on the first end of the lamp tube;
   a second detecting circuit electrically connected to the second end of the lamp tube, for detecting voltage applied on the second end of the lamp tube; and
   a comparator electrically connected to the first detecting circuit and the second detecting circuit, for generating a protection signal based on a difference between the voltages applied on the first and second ends of the lamp tube, wherein the inverter adjusts the supply voltage in response to an amplitude of the protection signal in excess of a predetermined value corresponding to an open-circuit of the lamp tube.

3. The liquid crystal display of claim 2, characterized in that the lamp tube is a Cold Cathode Fluorescent Lamp (CCFL).

4. The liquid crystal display of claim 2, characterized in that a phase difference between the first driving voltage signal and the second driving voltage signal is 180 degrees.

5. The liquid crystal display of claim 2, characterized in that the liquid crystal display further comprises a voltage calculator electrically connected to the comparator and the inverter, for generating a control signal having a duty cycle depending on the amplitude of the protection signal.

6. The liquid crystal display of claim 2, characterized in that the liquid crystal display further comprises a plurality of ballast capacitors electrically connected to the first end and the second end of the lamp tube.

7. A backlight module comprising, a lamp tube comprising a first end and a second end, an inverter comprising an input end electrically connected to an external power supply for inverting the external power supply into a supply voltage based on a control signal, a first transformer electrically connected to the first end of the lamp tube for converting the supply voltage into a first driving voltage signal, and outputting the first driving voltage signal to the first end of the lamp tube, a second transformer electrically connected to the second end of the lamp tube for converting the supply voltage into a second driving voltage signal, and outputting the second driving voltage signal to the second end of the lamp tube, characterized in that the backlight module further comprising:
   a first detecting circuit electrically connected to the first end of the lamp tube, for detecting voltage applied on the first end of the lamp tube;
   a second detecting circuit electrically connected to the second end of the lamp tube, for detecting voltage applied on the second end of the lamp tube;
   a comparator electrically connected to the first detecting circuit and the second detecting circuit, for generating a protection signal based on a difference between the voltages applied on the first and second ends of the lamp tube, wherein the inverter adjusts the supply voltage in response to an amplitude of the protection signal in excess of a predetermined value corresponding to an open-circuit of the lamp tube.

8. The backlight module of claim 7, characterized in that the lamp tube is a Cold Cathode Fluorescent Lamp (CCFL).

9. The backlight module of claim 7, characterized in that a phase difference between the first driving voltage signal and the second driving voltage signal is 180 degrees.

10. The backlight module of claim 7, characterized in that the backlight module further comprises a voltage calculator electrically connected to the comparator and the inverter, for generating a control signal having a duty cycle depending on the amplitude of the protection signal.

11. The backlight module of claim 7, characterized in that the backlight module further comprises a plurality of ballast capacitors electrically connected to the first end and the second end of the lamp tube.

* * * * *